(12) United States Patent
Gummalla et al.

(10) Patent No.: US 6,614,799 B1
(45) Date of Patent: Sep. 2, 2003

(54) METHOD AND APPARATUS FOR DYNAMIC ADJUSTMENT OF CABLE MODEM BACK-OFF PARAMETERS IN A CABLE MODEM NETWORK

(75) Inventors: Ajay Gummalla, Atlanta, GA (US); Sunil Khaunte, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/234,774

(22) Filed: Jan. 20, 1999

(51) Int. Cl.$^7$ .................. H04L 12/28; H04L 12/56; H04N 7/173

(52) U.S. Cl. .................. 370/448; 370/395; 370/449; 370/461; 725/116; 725/131

(58) Field of Search .................. 370/229, 431, 370/468, 458, 461, 447, 448, 255, 520, 347, 395; 725/111, 117, 126, 131, 124, 125; 455/512, 513

(56) References Cited

U.S. PATENT DOCUMENTS

| | | | | |
|---|---|---|---|---|
| 4,528,663 | A | * 7/1985 | Citta | 370/229 |
| 5,404,353 | A | * 4/1995 | Ben-Michael et al. | 370/235 |
| 5,517,502 | A | * 5/1996 | Bestler et al. | 370/449 |
| 5,535,206 | A | * 7/1996 | Bestler et al. | 370/458 |
| 5,570,347 | A | * 10/1996 | Bestler et al. | 370/461 |
| 5,606,553 | A | * 2/1997 | Hart | 725/131 |
| 5,729,542 | A | * 3/1998 | Dupont | 370/346 |
| 5,790,533 | A | * 8/1998 | Burke et al. | 370/318 |
| 5,809,046 | A | * 9/1998 | Sayama | 714/708 |
| 5,828,663 | A | * 10/1998 | Ikegami | 370/347 |
| 6,075,787 | A | * 6/2000 | Bobeck et al. | 370/395 |
| 6,215,792 | B1 | * 4/2001 | Abi-Nassif | 370/458 |
| 6,285,665 | B1 | * 9/2001 | Chuah | 370/319 |
| 6,385,773 | B1 | * 5/2002 | Schwartzman et al. | 725/124 |
| 6,430,193 | B1 | * 8/2002 | Raissinia et al. | 370/448 |

OTHER PUBLICATIONS

S. Khaunte, Contention Based Reservation Access On The Upstream Cable Channel, Sep. 1997, MS thesis submitted to the School of Electrical and Computer Engineering Georgia Institute of Technology.
R. Rivest, Network Control by Bayesian Broadcast, Sep., 1985, Report MIT/LCS/TM–287, Laboratory for Computer Science at Massachusetts Institute of Technology.
D. Sala, D. Hartman, J. Limb, Comparison of Algorithms for Station Registration on Power–up in an HFC Network, Sep. 17, 1996, IEEE802.14 WG, No. IEEE 802.14–96/012.
D. Sala, J. Limb, S. Khaunte, Adaptive MAC Protocol for a Cable Modem, May, 1997, GIT–CC–97/14, College of Computing Georgia Institute of Technology.

* cited by examiner

Primary Examiner—Huy D. Vu
Assistant Examiner—M. Phan
(74) Attorney, Agent, or Firm—Beyer Weaver & Thomas LLP

(57) ABSTRACT

A technique is provided for dynamically adjusting modem back-off parameters in a cable modem network. The technique is based on the theoretical result that the ratio of the number of the successful band width requests (Ns) to the number of collisions (Nc) has a value (e-31) when the back-off values are correctly estimated. The present technique for dynamically adjusting modem back-off parameters utilizes this concept to correspondingly correct the back-off parameters, depending upon the value of the Nc/Ns ratio, so as to cause this ratio to converge to the desired ratio of Nc/Ns equal to approximately 0.7. If the ratio of Nc/Ns is greater than a first specified value, the back-off start and backoff-end parameters (broadcast by the CMTS to cable modems on the downstream channel) are increased. If the ratio of Nc/Ns is less than a second specified value, the back-off start and backoff-end parameters are decreased. The present technique provides for improved access delay and improved throughput performance in contention subchannels of cable access networks, particularly those involving large round trip delays. Additionally, the technique of the present invention utilizes elementary CPU operations, making it a viable and cost-efficient solution which is easily implemented and allows for rapid execution in existing cable modem network systems. Furthermore, the technique of the present invention is able to track the number of contending cable modems in a network over a much larger range than previous techniques.

33 Claims, 9 Drawing Sheets

Upstream Channel[i] to CMTS
(Prior Art)

Initial Ranging Subchannel
(Prior Art)

Bandwidth-Request Subchannel
(Prior Art)

METHOD AND APPARATUS FOR DYNAMIC ADJUSTMENT OF CABLE MODEM BACK-OFF PARAMETERS IN A CABLE MODEM NETWORK

BACKGROUND OF THE INVENTION

1. Field of Invention

The present invention relates generally to methods and apparatus for transmitting digital data in cable television network systems. More specifically, the present invention relates to methods and apparatus for dynamically adjusting modem back-off parameters in a cable modem network.

2. Background

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have installed the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be upto 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 that is needed when transmitting and receiving data using cable modems. Block 104 of FIG. 1 represents a cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate MAC level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below). Each fiber node 108 can normally service upto 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide upto a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 kbyte Image

| Telephone Modem (28.8 kbps) | 6–8 minutes |
| ISDN Line (64 kbps) | 1–1.5 minutes |
| Cable Modem (30 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

In cable systems, digital data is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

Although not fully agreed to by all parties in the cable TV and cable modem industry, an emerging standard establishing the protocol for two-way communication of digital data on cable systems has been defined by a consortium of industry groups. The protocol, known as the Multimedia Cable Network System (MCNS), specifies particular standards regarding the transmission of data over cable systems.

FIG. 2 is a block diagram of a two-way hybrid fiber-coaxial (HFC) cable system including cable modems and a network management station. The main distribution component of an HFC cable system is a primary (or secondary) hub 202 which can typically service about 40,000 subscribers or end-users. Hub 202 contains several components of which two, relevant to this discussion, are shown in FIG. 2. One component is a cable modem termination system or, CMTS, 204 needed when transmitting data (sending it downstream to users) and receiving data (receiving upstream data originating from users) using cable modems, shown as boxes 206, 208, 210, and 212. Another component is a fiber transceiver 214 used to convert electrical signals to optical signals for transmission over a fiber optic cable 216. Fiber optic cable 216 can typically run for as long as 200 km and is used to carry data (in one direction) for most of the distance between hub 202 to a neighborhood cable TV plant 217. More specifically, fiber optic cable 216 is a pair of cables—each one carrying data in one direction. When the data reaches a particular neighborhood cable TV plant 217, a fiber node 218 converts the data so that it can be transmitted as electrical signals over a conventional coaxial cable 220, also referred to as a trunk line. Hub 202 can typically support up to 80 fiber nodes and each fiber node can support up to 500 or more subscribers. Thus, there are normally multiple fiber optic cables emanating from hub 202 to an equal number of fiber nodes. In addition, the number of subscribers as well as fiber capacity is currently increasing due to dense wave-division multiplexing technology. DWDM is a technique for transmitting on more than one wavelength of light on the same fiber.

Cable TV (CTV) taps 222 and 224 are used to distribute a data signal to individual cable modems 206 and 210 (from CTV tap 224) and modems 208 and 212 (from CTV tap 222). Two-way cable TV amplifiers 226 and 228 are used to amplify signals as they are carried over coaxial cable 220.

Data can be received by the cable modems shown (each CTV tap can have output cables servicing multiple cable modems) and transmitted back to hub 202. In cable systems, digital data is carried over radio frequency (RF) carrier signals. Cable modems are devices that modulate an RF signal to a digital signal and demodulate a digital signal to an RF signal for transmission over a coaxial cable. This modulation/demodulation is done at two points: by a cable modem at the subscriber's home and by CMTS 204 located at hub 202. If CMTS 204 receives digital data, for example from the Internet, it converts the digital data to a modulated RF signal which is carried over the fiber and coaxial lines to the subscriber premises. A cable modem then demodulates the RF signal and feeds the digital data to a computer (not shown). On the return path, the operations are reversed. The digital data is fed to the cable modem which converts it to a modulated RF signal. Once CMTS 204 receives the RF signal, it demodulates it and transmits the digital data to an external source.

Data packets are addressed to specific modems or to a hub (if sent upstream) by a MAC layer 230 in CMTS 204 at hub 202 (there is also a MAC addressing component, not shown, in the cable modems that encapsulate data with a header containing the address of the hub when data is being sent upstream). CMTS 204 has a physical layer 232 for receiving and transmitting RF signals on the HFC cable plant. The main purpose of MAC layer 230 is to encapsulate a data packet within a MAC header according to the DOCSIS standard for transmission of data. This standard is currently a draft recommendation (J.isc Annex B) which has been publicly presented to Study Group 9 of the ITU in October 1997, and is known to persons in the cable modem data communication field. MAC layer 230 contains the necessary logic to encapsulate data with the appropriate MAC addresses of the cable modems on the system. Each cable modem on the system has its own MAC address. Whenever a new cable modem is installed, its address is registered with MAC layer 230. The MAC address is necessary to distinguish data going from the cable modems since all modems share a common upstream path, and so that CMTS 204 knows where to send data. Thus, data packets, regardless of format, are mapped to a particular MAC address. MAC layer 230 is also responsible for sending out polling messages as part of the link protocol between the CMTS and the cable modems that is necessary to maintain a communication connection between the two.

Basic data connectivity on the cable system typically requires a single upstream channel (to carry return signals from the cable modem to the cable head-end) and a single downstream channel carrying signals from the head-end to the cable modems. A cable access network typically comprises multiple upstream channels and multiple downstream channels.

On the downstream cable data channel, data is broadcast by a single head-end (CMTS) to cable modems served on that downstream channel. However, the upstream channel is complicated by the fact that it is used as a multiple access channel which is shared by the large group of cable modems (on that channel) to communicate with the CMTS. The upstream channel is time-slotted and cable modems need to contend for gaining access to the CMTS in this shared channel.

As mentioned previously, each DOCSIS upstream cable channel is time-slotted. The basic unit of scheduling is a minislot. The CMTS remotely schedules each and every minislot on the upstream channel. Some contiguous minislots are grouped together as a unicast data slot meant to be used by a specific cable modem for sending its data upstream. Some minislots are marked as contention slots that can be used by any cable modem to send ranging/bandwidth requests upstream to the CMTS. The CMTS conveys this minislot allocation information (to the set of modems sharing the upstream channel) ahead of time using bandwidth allocation MAP messages which are periodically broadcast on the downstream channel. In general any given upstream channel [i] includes two logical sub-channels: a contention sub-channel comprising contention minislots which can be used by any cable modem, and a reservation or grant sub-channel comprising minislots allocated to specific cable modems. This is shown, for example, in FIG. 3 of the drawings.

FIG. 3A illustrates the various types of minislots allocated by the CMTS on the upstream channel[i] 300. FIGS. 3B and 3C illustrate the initial ranging subchannel and bandwidth-request subchannel which are included in the upstream channel 300 of FIG. 3A.

For simplification purposes, and to avoid confusion, the "[i]" portion of the upstream or downstream channel and/or elements related thereto may not be included in the discussion below. However, it is to be understood that the techniques described herein with respect to a particular channel may also be applied to other channels in the network.

There are two basic types of contention slots allocated by the CMTS on the upstream, each being used for a different purpose by the cable modems. A first type of contention slot is an Initial Ranging Slot, identified in FIG. 3A as slot 301. This contention slot on the upstream is made up of a group of minislots forming a 2 ms wide time slice. This region is intended to be used only by "new" cable modems during their cable interface initialization phase to join the HFC network, such as, for example, during initial powering up of the cable modem. Once the CMTS receives an initial ranging request from a new modem in this type of slot, the CMTS subsequently polls the modem (along with other modems identified in the network) using unicast (non-contention) station maintenance slots (not shown in FIG. 3).

A second type of contention slot is a Bandwidth-Request Minislot. The CMTS marks some of the upstream minislots as contention based bandwidth-request minislots, as shown, for example, by slot 305 of FIG. 3A. Any cable modem having upstream data to send, can/will use this type of minislot to request the CMTS for a data grant (slot 303, FIG. 3A) in which to send its actual data in non-contention mode. The stream of initial ranging slots and the bandwidth-request slots form two independent contention subchannels on each upstream channel as shown in FIGS. 3B and 3C, namely the initial ranging subchannel and bandwidth-request subchannel, respectively. For purposes of simplification, initial ranging slots and bandwidth-request slots will collectively be referred to as "contention slots" or "contention minislots."

As per the DOCSIS Cable MAC protocol, a common method of contention resolution on the upstream multiple access channel is through the use of a truncated binary exponential back-off algorithm in which the back-off window is controlled by the CMTS. The initial and final back-off windows are specified by the CMTS in the form of back-off start (BS) and back-off end (BE) parameters in the channel MAPs. These back-off window parameters are expressed as a power of two. For example, a back-off window parameter of 5 indicates a window of $2^5=32$ random numbers, selected from the range 0–31. When a cable modem collides for the first time, it sets its internal back-off window equal to the back-off start window parameter specified by the CMTS in the upstream channel MAP. It then picks a random number from this window of numbers. The random number chosen by the modem (herein referred to as a modem back-off value) is the number of contention slots it will defer before re-transmitting its request to the CMTS. Since each of the colliding modems independently picks a random number from this window, the chances of more than one modem choosing the same random number is low.

Thus the modems usually succeed in their second attempt. However if the number of modems that had originally collided is large, as compared to the window of slots that each modem is using for choosing its random number, there is a high probability that at least two modems will select the same random number and collide again. Each time the modems collide, they increment their internal back-off window by one, until the back-off window reaches the value of the back-off end parameter. Thus back-off end represents the largest window of numbers from which to select the number of deferred contention slots.

From the above explanation, it can be seen that the proper choice of an internal back-off window at the cable modem is an important factor for access-delay/throughput performance in the contention channel. When the original number of colliding modems is relatively small, it is preferable that the modem selects a random number from a small back-off window. The small back-off window ensures that the modem is not unnecessarily backing-off too many contention slots, thereby incurring unnecessary access delay. On the other hand, in the case of a regional power outage, for example, many cable modems will be contending at the same time to communicate with the CMTS. In this situation, a small back-off window will result in very poor performance since the modems will not be sufficiently randomized over time to prevent collisions due to more than one modem contending for the same contention slot. Thus, where the number of modems that had originally collided is large, it is preferable that a large internal back-off window be used so that the colliding modems are well randomized in time for their retransmissions.

There is no single, fixed back-off window value that works well for all upstream contention load scenarios. It is desirable, therefore, for the CMTS to incorporate an intelligent technique to estimate how many modems are currently involved in the collision resolution process, and to dynamically adjust the back-off window parameters (in the channel MAPs) accordingly. Additionally, it is desirable to provide a technique for dynamically estimating the number of cable modems simultaneously contending for upstream access in order to provide for improved access delay and improved throughput performance in the upstream contention sub-channels of the cable modem network. Further, it is desirable to provide a cost-effective technique for determining cable modem back-off parameters which may be easily implemented and rapidly executed in existing cable modem network systems.

SUMMARY OF THE INVENTION

According to specific embodiments of the invention, a technique is provided for dynamically adjusting modem back-off parameters in a cable modem network. The technique of the present invention provides for improved access delay and improved throughput performance in contention sub-channels of cable access networks, particularly those involving large round trip delays. Additionally, the technique of the present invention utilizes elementary CPU operations, making it a viable and cost-efficient solution which is easily implemented and allows for rapid execution in existing cable modem network systems. Furthermore, the technique of the present invention is able to track the number of contending cable modems in a network over a much larger range than previous techniques.

According to a specific embodiment of the present invention, a method is provided for dynamically adjusting modem back-off parameters in a cable modem network. The cable modem network includes a Cable Modem Termination System (CMTS), and includes a plurality of cable modems. The modem back-off parameters are utilized by the cable modems to determine a deferment period during which communication requests to the CMTS on the upstream channel are not attempted. The back-off parameters include a back-off start (BS) parameter and a back-off end (BE) parameter. The method comprises the steps of determining a number (Ns) of contention slots in a sampling interval in which modem requests are successfully received by the CMTS; determining a number (Nc) of contention slots in the sampling interval in which modem requests are unsuccessfully received by the CMTS due to collisions with at least one other modem request; dynamically adjusting the modem back-off parameters based upon a ratio of the Ns and Nc parameters; and communicating the dynamically adjusted back-off parameters to the plurality of cable modems in the network. An additional aspect of this embodiment includes the steps of increasing the back-off start parameter if the ratio of Nc/Ns is greater than a first specified value; and decreasing the back-off start parameter if the ratio of Nc/Ns is less than a second specified value.

A second specific embodiment of the present invention provides a method for dynamically adjusting modem back-off parameters in a cable modem network. The method comprises the steps of comparing estimates of a first number (Ns) of modem request successfully received by the CMTS with a second number (Nc) of modem requests unsuccessfully received by the CMTS due to collisions between at least two modems contending for the same contention slot; dynamically adjusting themodem back-off parameters based upon the comparison of the Ns and Nc values, wherein the dynamic adjustment of the back-off parameters is not based upon a value representing a number of empty or unused contention slots; and communicating the dynamically adjusted back-off parameters to the plurality of cable modems in the network. An additional aspect of this embodiment includes the steps of increasing the back-off start parameter if the ratio of Nc/Ns is greater than a first specified value; and decreasing the back-off start parameter if the ratio of Nc/Ns is less than a second specified value.

A third specific embodiment provides an apparatus for dynamically adjusting modem back-off parameters in a cable modem network. The apparatus comprises, among other things, a counter for determining a number (Ns) of contention slots in a sampling interval in which modem requests are successfully received by the CMTS; a counter for determining a number (Nc) of contention slots in the sampling interval in which modem requests are unsuccessfully received by the CMTS due to collisions with at least one other modem request; means for dynamically adjusting the modem back-off parameters based upon a ratio of the Ns and Nc parameters; and means for communicating the dynamically adjusted back-off parameters to the plurality of cable modems. The back-off parameters include a back-off start (BS) parameter and a back-off end (BE) parameter. The means for dynamically adjusting the modem back-off parameters may also include means for increasing the back-off start parameter if the ratio of Nc/Ns is greater than the first specified value; and means for decreasing the back-off start parameter if the ratio of Nc/Ns is less than a second specified value.

A fourth specific embodiment of the present invention provides a cable modem termination system in a cable modem network comprising, among other things, means for comparing estimates, within a specified time interval, of a first number (Ns) of upstream modem requests successfully received by the CMTS and a second number (Nc) of upstream modem requests unsuccessfully received by the CMTS due to collisions between at least two modems contending for a first contention slot; and means for dynamically adjusting the modem back-off parameters based upon the Ns parameter and the Nc parameter, wherein the dynamic adjustment of the back-off parameters is not based upon a value representing a number of empty or unused contention slots. Additionally, the system comprises means for communicating the dynamically adjusted back-off parameters to the plurality of cable modems, wherein the cable modem back-off parameters are utilized by the cable modems to determine a deferment period during which communication requests to the CMTS are not attempted. The back-off parameters include a back-off start (BS) parameter and a back-off end (BE) parameter. The means for dynamically adjusting the modem back-off parameters may also include means for increasing the back-off start parameter if the ratio of Nc/Ns is greater than the first specified value; and means for decreasing the back-off start parameter if the ratio of Nc/Ns is less than a second specified value.

A fifth specific embodiment of the present invention provides a computer program product for dynamically adjusting modem back-off parameters in a cable modem network. The cable modem network includes a CMTS and a plurality of cable modems. The modem back-off parameters are utilized by the cable modems to determine a deferment period during which upstream communication requests to the CMTS are not attempted. The back-off parameters include a back-off start parameter and a back-off end parameter. The computer program product comprises a computer usable medium having computer readable code embodied therein. The computer readable code comprises computer code for comparing estimates, within a specified time interval, of a first number (Ns) of modem requests successfully received by the CMTS and a second number (Nc) of modem request unsuccessfully received by the CMTS due to collisions between at least two modems contending for a first contention slot. The computer readable code further comprises computer code for dynamically adjusting the modem back-off parameters based upon a ratio of the Ns and Nc parameters; and computer code for communicating the dynamically adjusted back-off parameters to the plurality of cable modems. Additionally, the computer program product may include computer code for increasing the back-off start parameter if the ratio of Nc/Ns is greater than a first specified value; and computer code for decreasing the back-off start parameter if the ratio of Nc/Ns is less than a second specified value.

Additional features and advantages of the present invention will become apparent from the following description of its preferred embodiments, which descriptions should be taken in conjunction with the accompanying drawings.

DETAILED DESCRIPTION OF THE PREFERRED EMBODIMENT

Figure 1:
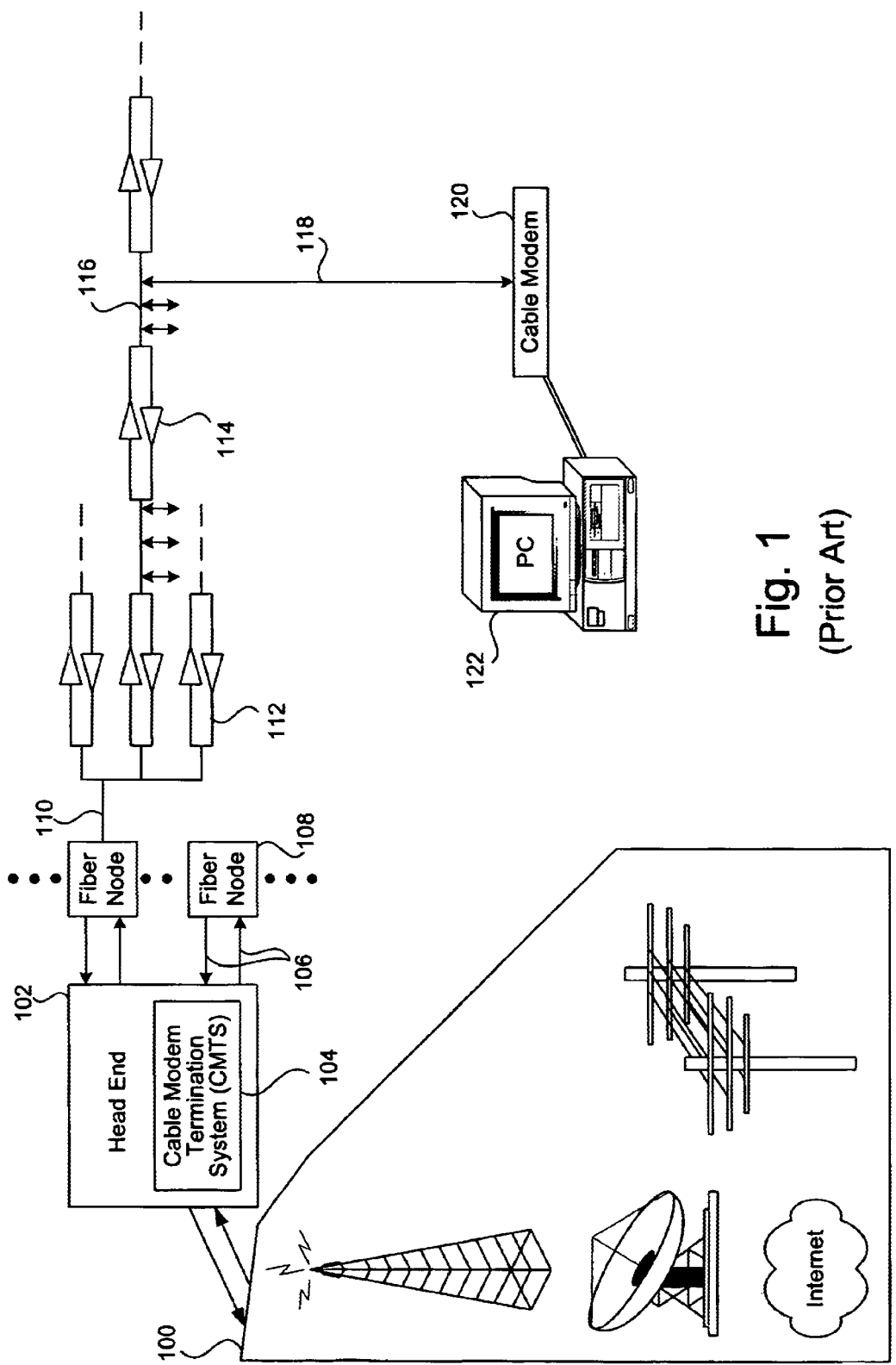
FIG. 1 is a block diagram of a two-way hybrid fiber-coaxial (HFC) cable system utilizing a cable modem for data transmission.

The present invention provides a technique which can be implemented at the CMTS or Cable Router Headend to better control the operation of cable modems in the network by using the contention subchannels of the upstream channel to estimate the number of contending cable modems on the upstream channel. It uses a theoretically proven relation between the number of successful transmissions and number of collisions on a contention access channel to serve as a metric in correcting this CMTS estimate. The present technique improves the overall upstream channel delay/throughput performance, and also improves the HFC network recovery time following a catastrophic power failure in the network or other such problems which result in multiple modems attempting to re-establish contact with the CMTS at about the same time.

As described in greater detail below, conventional algorithms which use the number of empty, collided and successful contention minislots to estimate the number of contending users over a sampling interval give very poor estimates of the actual contending users due to the large round-trip delay involved in getting feedback about the collisions.

As described in the Background section of this application, CMTS allocates contention slots for initial ranging and bandwidth-requests to the cable modems in the network. However, since each of these contention slots may be used by any cable modem, collisions frequently occur between at least two modems contending for the same contention slot. In case of a collision, the each modem involved independently determines a random number of contention slots which it will defer before re-transmitting its request to CMTS. This random number of deferred contention slots may be referred to as a back-off value. Since each modem independently determines its own random back-off value, eventually each modem will end up choosing a different slot in which to retransmit, thereby resolving the collision problem.

Each modem chooses its back-off value from a window of back-off parameters specified by the CMTS. More specifically, the back-off parameters are included within the channel MAP broadcast by CMTS to the downstream cable modems associated with that particular channel. These back-off parameters include a back-off start (BS) parameter and a back-off end (BE) parameter. Because the number of cable modems associated with a particular cable channel may vary considerably, each cable channel[i] has its own associated BS[i] and BE[i] parameters. However, for purposes of simplification, and to avoid confusion, the technique of the present invention will be described in terms of a particular channel[i] for analysis, with the understanding that the present technique may be applied to other channels in the same or similar manner. For this reason, back-off parameters BS[i] and BE[i] may be represented as BS and BE in the discussion below, with the understanding that these parameters are associated with a particular channel[i].

Each cable modem in the network uses the back-off parameters to determine a range of possible back-off values. For example, in MCNS protocol the cable modems use a truncated binary exponential back-off algorithm to determine the number of contention minislots to defer before retrying. The CMTS specifies the window of values ([back-off_start, back-off_end]) to be used by the cable modems to decide how many contention minislots to defer. The size of the window is controlled by the current back-off exponent (specified as a power of 2) at the cable modem. For example, if the current value of the back-off exponent at a particular cable modem is 3, the modem will choose a random number from the values within the range $[0, 2^3-1]$, which translates to the range $[0, 1, 2, \ldots 7]$. Once a random number has been selected from this range (the random number being the back-off value), the modem will attempt to retransmit to CMTS after it has deferred a number of contention slots equal to the selected random number.

When a modem detects that its request to CMTS has resulted in a collision, it starts with a local exponent value= back-off start and then increments its local exponent by 1 each time it collides, until the back-off end parameter is reached. The exponent value used by a modem should preferably be small if there are few modems that have collided. Under such conditions, a small back-off exponent may help to avoid unnecessary access delays by preventing the collided modems from deferring too many contention slots unnecessarily.

However, if there are a large number of modems simultaneously trying to gain access to the CMTS, a backlog of collided modems may result. For example, during recovery from a catastrophic power failure in a network, hundreds (or even thousands) of modems may simultaneously may attempt to re-establish contact with the CMTS. As a result, hundreds of collisions may occur between modems contending for the same contention slot on the upstream channel, thereby resulting in a back log of collided modems which are awaiting to re-establish contact with the CMTS. In such a situation, it is preferable to increase the range of values from which each modem chooses its back-off value in order to reduce the chance of multiple modems continually selecting the same back-off value. Thus, it is preferable that the CMTS remotely monitor traffic load (back log) developing in the upstream contention channel and dynamically adjust the back-off start and back-off end parameters accordingly so that the colliding modems are properly randomized in time to allow optimal utilization of contention slots.

In order to provide optimal performance in the cable modem network, it is important that the back-off parameters provided by the CMTS be as accurate as possible. In order to increase the accuracy of the values of these back-off parameters, it is preferable that the CMTS obtain an accurate estimate of the number of cable modems which are simultaneously attempting to establish or reestablish contact with the CMTS. One technique for estimating the number of contending stations is described in a publication entitled "Network Control By Bayesian Broadcast", by R. Rivest, report MIT/LCS/TM-287, Cambridge, Mass.: MIT, Laboratory for Computer Science, herein incorporated by reference in its entirety for all purposes. In this technique, each station tries to estimate how many other stations are trying to access the corresponding contention channel by using statistics of the number of successfully received contention slots, the number of collided contention slots, and the number of empty contention slots on a given contention channel.

The number of successes Ns refers to the number of contention slots in a sampling interval which result in a success. The term "success" may be defined as a valid bandwidth request received by the CMTS in case of a request minislot, or a valid initial ranging request received by the CMTS in the case of an initial ranging slot. The number of collisions Nc refers to the number of contention slots in a sampling interval which result in a collision. A collision in a request minislot means that multiple modems are sending bandwidth-requests in that request minislot, resulting in garbage being received by the CMTS. Collisions in initial ranging slots mean that multiple new modems are using the same initial ranging slot to send their initial ranging request to the CMTS. The number of empty contention slots Ne refers to the number of empty contention slots in the sampling interval which are empty or unused.

For simplicity, and in order to avoid confusion in the present application, techniques for adjusting modem back-off parameters will be explained in context of a general contention-based channel. Thus, the term "contention" slot as used herein is meant to include both initial ranging slots and bandwidth-requests slots. Additionally, the expressions Nc, Ns, Ne, $\Delta$Nc, $\Delta$Ns, and $\Delta$Ne have also been simplified in that each expression lacks reference to its associated channel[i]. Thus, any reference to these expressions is to be interpreted as applying to a selected channel[i], with the understanding that the technique of the present invention may be applied to any desired channel.

The Rivest technique determines modem back-off values based upon three variables: (1) the number of collisions, (2) the number of successes, and (3) the number of empty contention slots in a sampling interval. However, tests conducted by the present inventive entity reveals that the Rivest technique experiences problems in accurately estimating the number of contending cable modems in a network, particularly in networks such as cable modem networks which experience relatively long roundtrip delays. More particularly, the Rivest technique assumes that the distance between the device/source (e.g., cable modem) and collision channel is small, thereby providing immediate feedback to the device when collisions occur. However, in cable modem systems, cable distances may exceed 80 km, and feedback delays may be 20 mS or more.

Moreover, test results have revealed that, in long distance round-trip systems such as cable modem network systems, using the number of empty contention slots Ne in the upstream channel as a factor for determining modem back-off parameters produces inaccurate values for the modem back-off parameters. The cause for the inaccuracy is at least in part due to delay factors within in the cable modem system such as, for example, propagation delays, fixed interleaver delays, and scheduler delays at the head end of the cable system. Although the Rivest technique assumes immediate feedback, delays in cable modem systems may exceed 20 milliseconds. For example, interleaving and processing delays at the Headend may add a 4 millisecond delay or longer, and the distance due to the feedback loop may introduce delays up to or exceeding 20 milliseconds.

In typical cable modem systems, the duration of time involved from the time a cable modem makes a request to receiving feedback about the success/failure of its. transmission is around 8 milliseconds. MCNS protocols specify that a cable modem may only have one request outstanding at any time. Therefore, when the number of contending cable modems is small (compared to the number of contention minislots in one roundtrip time), a large fraction of the minislots will be idle because a large fraction of the cable modems are waiting for a response from the head end. This, in turn, increases the number of empty contention slots in the upstream channel, which skews the estimate of backlogged cable modems when using the Rivest protocol.

In order to remedy this problem, the mathematical algorithm of the Rivest protocol for determining back-off parameters has been modified to eliminate the usage of the number of empty contention slots Ne in the sampling interval when estimating the number of cable modems contending for slots on the upstream channel. However, tests conducted by the present inventive entity using this modified Rivest technique have produced inaccurate results. The test data indicates that the Rivest technique produces inaccurate results when modified to not factor in the number of empty contention slots when determining new modem back-off parameters. Accordingly, use of this modified Rivest technique is undesirable.

Accordingly, an alternative technique for dynamically adjusting modem back-off parameters in a cable modem network is proposed. This technique is based on the theoretical result that the ratio of the number of the successful band width requests Ns to the number of collisions Nc has a value (e-2) when the back-off values are correctly estimated.

From theory, it is known that for maximum throughput in a cable modem system where N cable modems are contending for upstream access, the probability (p) of transmitting in a given contention slot should be:

$$p=1/N$$

Given the above, the probability of a transmission being successful may be expressed as:

$P(S)=N*p*(1-p)^{(N-1)}$, which, as the limit of N approaches infinity tends to:

$$P(S)=1/e.$$

The probability that there is no transmission for a given contention slot (i.e. hat the contention slot is empty) may be expressed as:

$P(E)=(1-p)^N$, which, as the limit of N approaches infinity tends to:

$$P(E)=1/e.$$

The probability of a transmission resulting in a collision may be expressed as:

$$P(C)=1-P(S)-P(E)=1-(2/e)=(e-2)/2$$

It is also given that:
Nc P(C), and
Ns P(S), so $$\frac{Nc}{Ns} = \frac{P(C)}{P(S)} = \frac{\frac{(e-2)}{e}}{\frac{1}{e}} \Rightarrow Nc = Ns*(e-2) \approx 0.718Ns$$

Thus, from the above equations, when theoretically ideal back-off values have been chosen by each cable, modem contending for upstream access to the CMTS (e.g., a back-off value equal 1/500 for 500 contenders), the ratio of Nc/Ns will approach the value 0.718. Therefore, as the back-off value selected by each cable modem in the network contending for upstream access (to the CMTS) approaches its theoretically optimal value, the ratio of Nc/Ns should start approaching the value 0.7, approximately. If the selected back-off values are not correct, than the resulting ratio of Nc/Ns would diverge from the value 0.718. The present inventive technique for dynamically adjusting modem back-off parameters utilizes this concept to correspondingly correct the back-off parameters, depending upon the value of the Nc/Ns ratio, so as to cause this ratio to converge to the desired ratio of Nc/Ns equal to approximately 0.7.

It is to be understood that the present inventive technique is not limited to the particular mathematical function as described above. Other mathematical formulas which compare the ratios of Nc and Ns to a predetermined constant may be used without departing from the scope of this invention. For example, it is possible to invert the formula described above such that the back-off parameters are dynamically adjusted so that the ratio of Ns/Nc is approximately equal to 1.392. Additionally, it is intended that the scope of the present inventive technique include any technique which dynamically adjusts modem back-off parameters based upon any function which (1) compares Ns and Nc values, and (2) does not utilize a number of empty or unused contention slots in determining the adjusted values for the back-off parameters.

Figure 4:
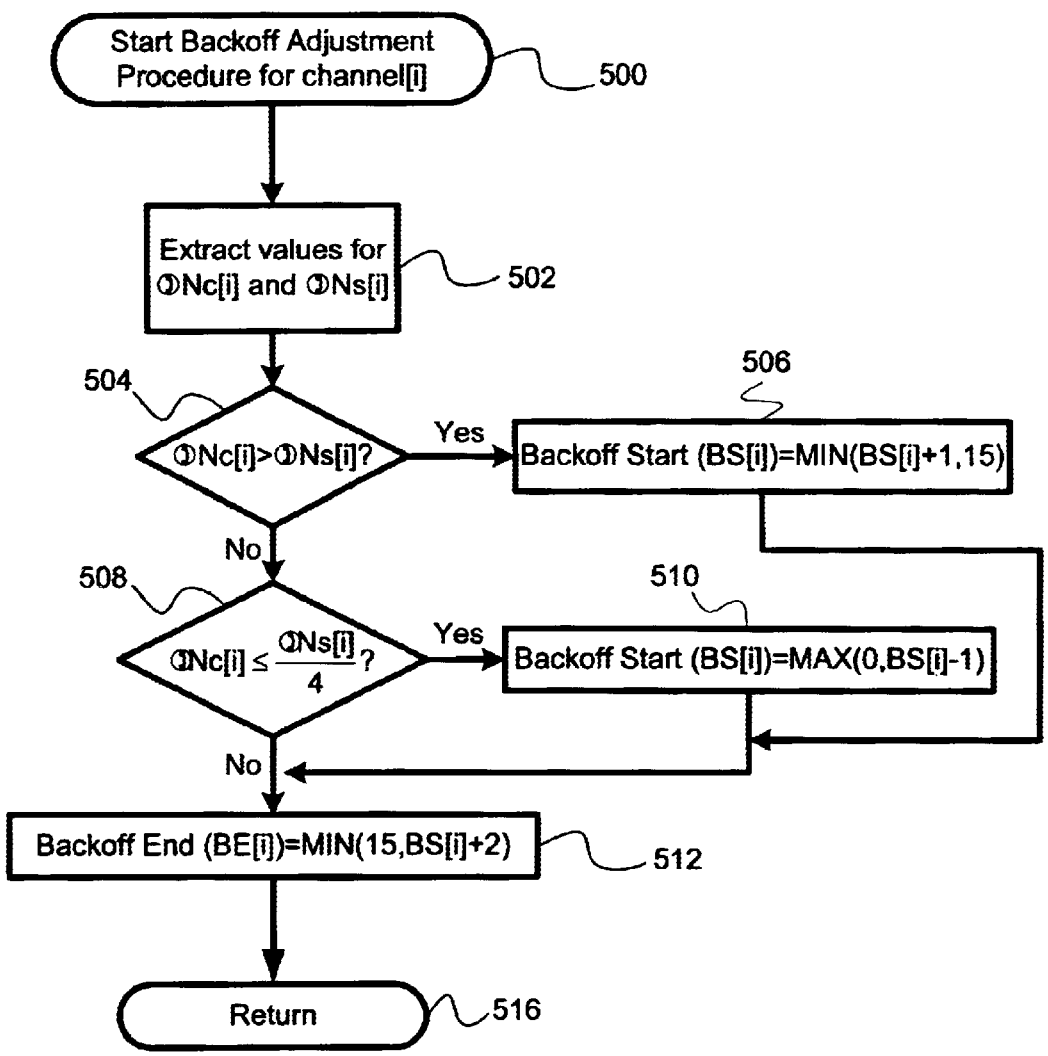
FIG. 4 shows a flow diagram of a dynamic back-off parameter adjustment algorithm in accordance with the technique of the present invention.
Figure 9:
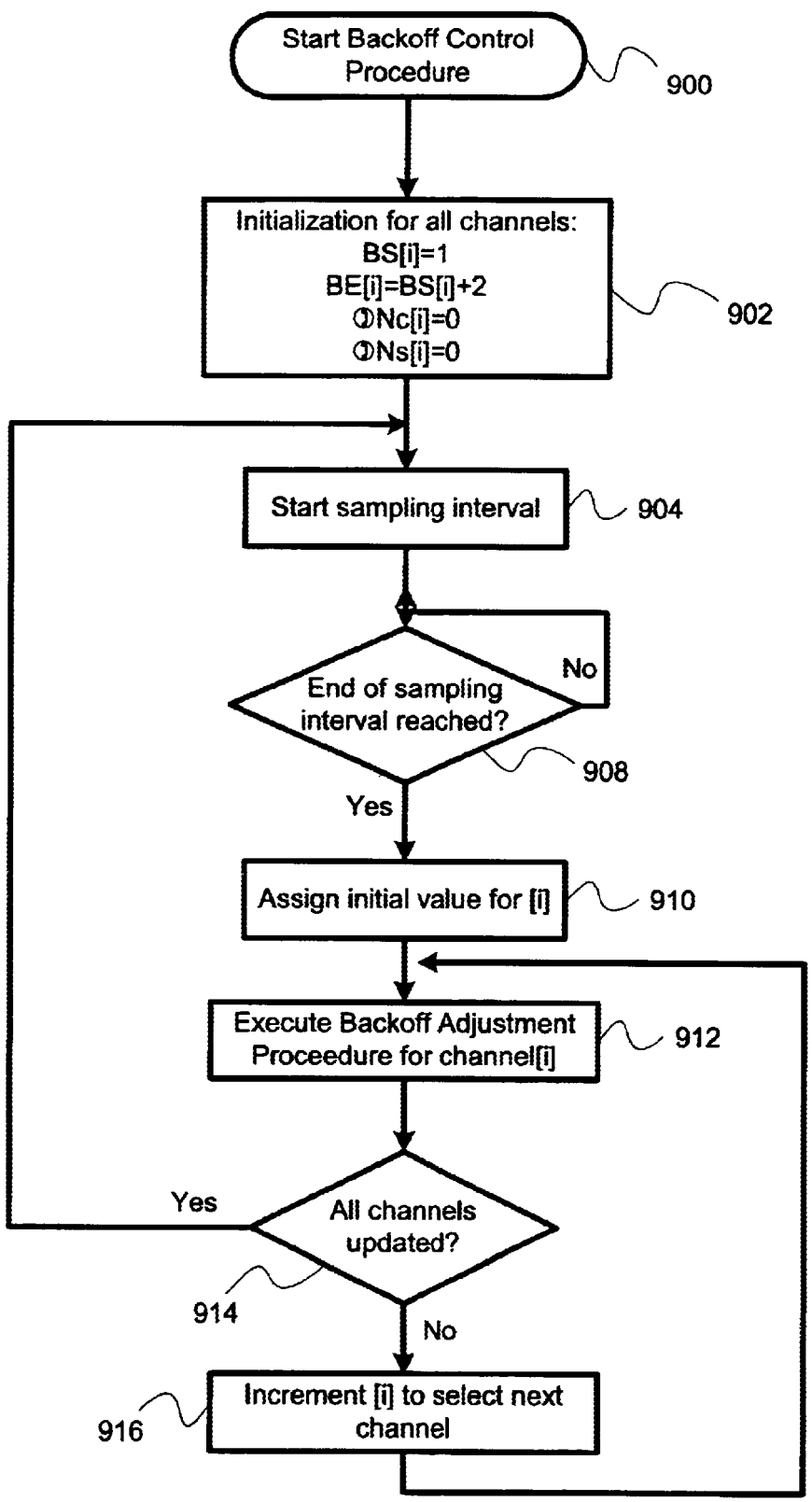
FIG. 9 shows a flow diagram illustrating a technique for dynamically adjusting respective back-off parameters in each channel of the network.

FIG. 4 shows a flow diagram illustrating a specific embodiment of the dynamic back-off procedure 500 of the present invention. In the specific embodiment of FIG. 4, procedure 500 functions as a subroutine which is called by procedure 900 of FIG. 9. The back-off control procedure 900 of FIG. 9 functions to select a particular channel[i] for back-off adjustment, and passes the channel number to the back-off adjustment procedure 500 (FIG. 4) so that the back-off parameters of the selected channel[i] are updated. The technique utilizes both hardware and software elements in performing its function.

Figure 2:
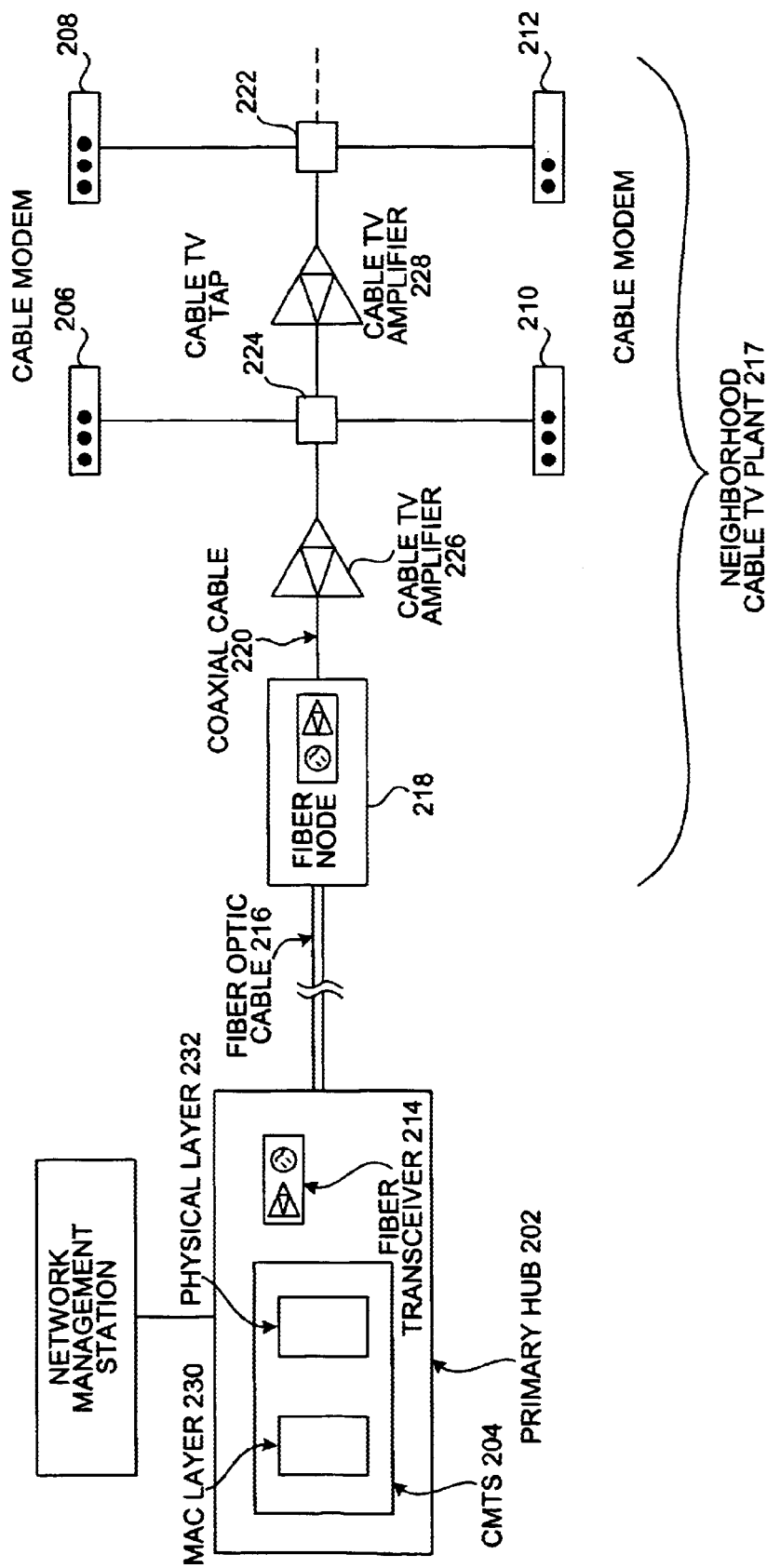
FIG. 2 is a block diagram of a two-way hybrid fiber-coaxial (HFC) cable system including cable modems and a network management station.
Figure 3A:
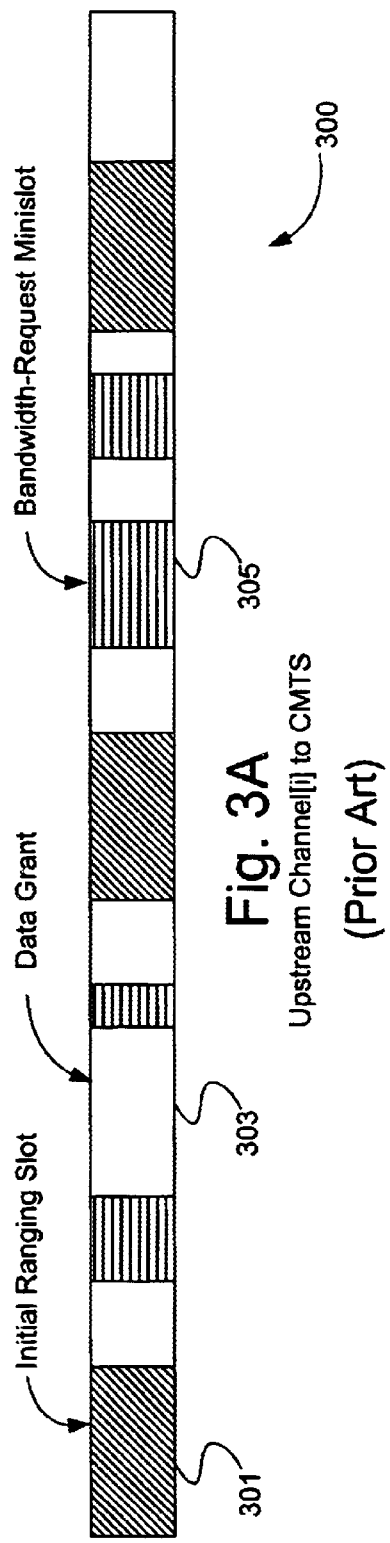
FIG. 3A shows an example of various mini slots which are included within an upstream channel from the cable modems to the CMTS.
Figure 3B:
FIGS. 3B and 3C illustrate initial ranging and bandwidth request sub-channels, respectively, which form a part of the upstream channel 300 of FIG. 3A.
Figure 3C:
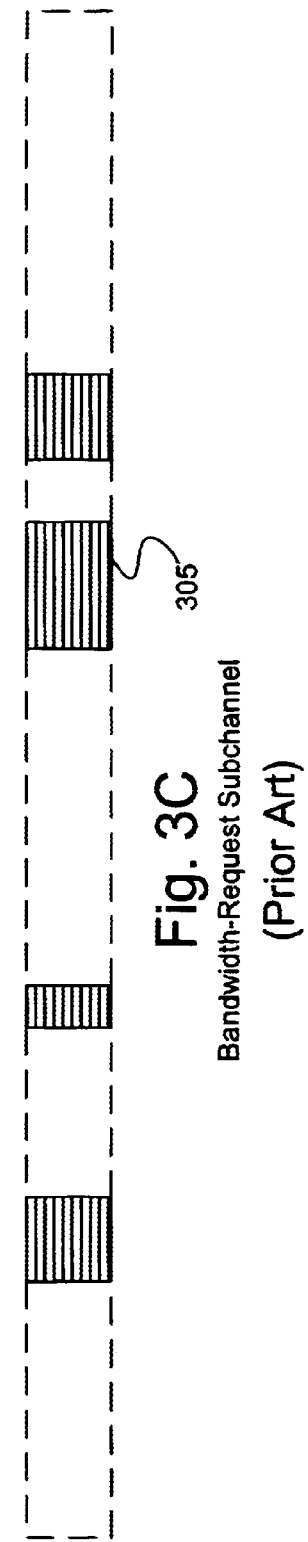

At step 902, all related counters and/or registers are set to their respective initial value. The respective back-off parameters BS and BE for each channel[i] (identified as BS[i] and BE[i]) are initialized to their respective initial values. Thus, the back-off start BS parameter for each respective channel [i] is set equal to 1, and the back-off end BE parameter for the same respective channel is set equal to the value (BS+2). It is to be noted that other initial values may be used where appropriate, without departing from the scope of the present invention. The BS and BE parameters may be implemented via either software or hardware. In the specific embodiment of FIGS. 4 and 9, the BS and BE parameters for each channel[i] are implemented in software, and reside within CMTS block 204 of FIG. 2.

Additionally, at step 902, the incremental counters ΔNc and ΔNs for each respective channel[i] (identfied as ΔNc[i]

and ΔNs[i]) are each set to zero. The incremental counter ΔNc is used to count the number of collisions which occur on a selected upstream channel during a sampling interval. Similarly, the ΔNs counter is used to count the number of requests successfully transmitted on the selected upstream channel and received at the CMTS during the sampling interval. There is a respective ΔNc and ΔNs counter for each channel[i], each of which may either be hardware based or software based. In the specific embodiment of the present invention, the ΔNc[i] and ΔNs[i] counters are implemented in software, as shown, for example, in FIG. 7.

Figure 7:
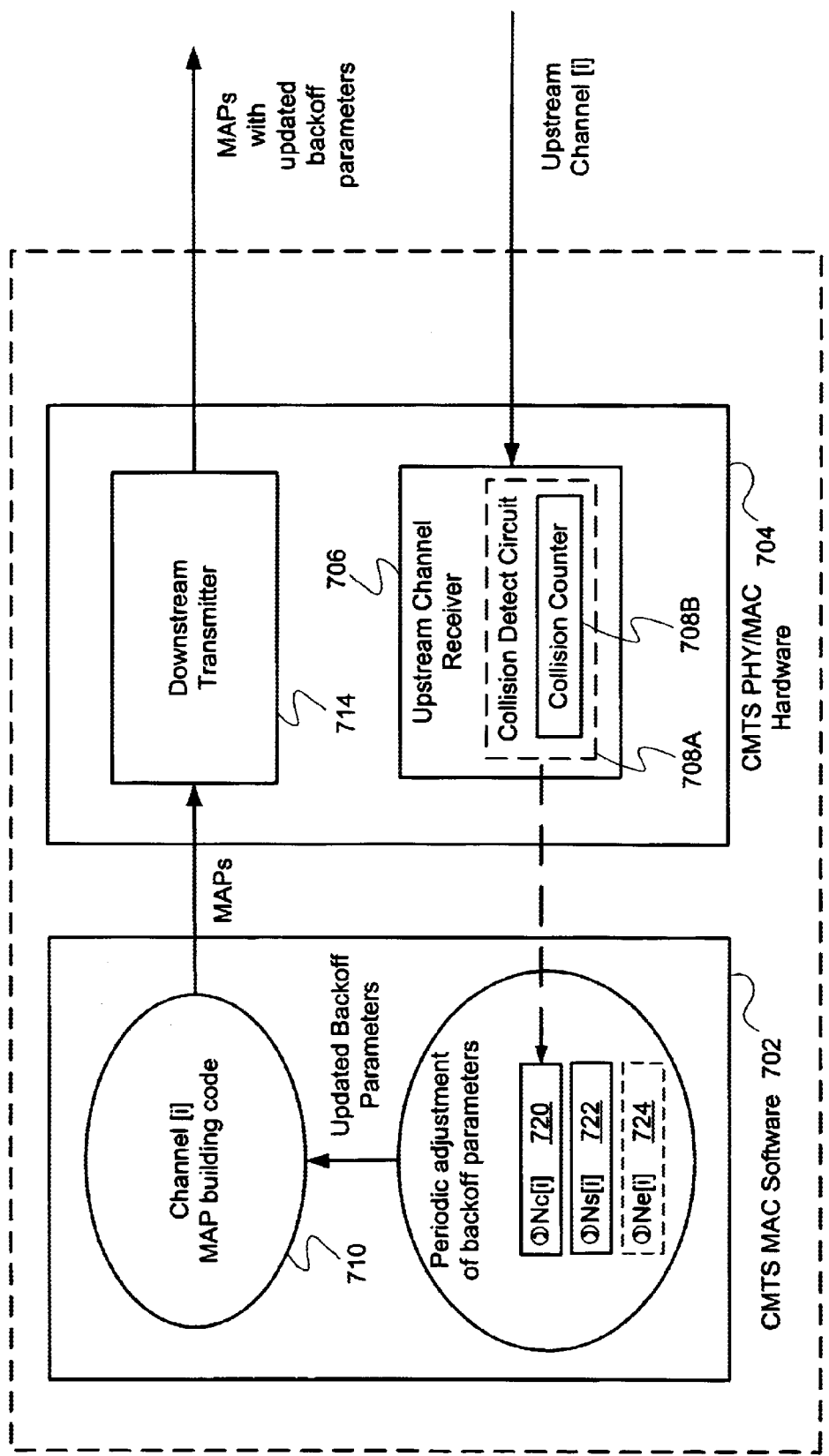
FIG. 7 illustrates a portion of the hardware and software comprised within CMTS block 204 of FIG. 2.

FIG. 7 shows a portion of the CMTS block 204, illustrating the various hardware and software components used for implementing the dynamic back-off adjustment technique of the present invention for a selected channel[i]. As shown in FIG. 7, the CMTS block 204 includes a CMTS MAC software portion 702 and a CMTS PHY/MAC hardware portion 704. In networks where multiple channels exist, 30 each channel will have assigned to it a respective a respective CMTS PHY/MAC hardware block 704. The CMTS MAC software block 702 may be used to handle all channels in the network, or alternatively, where desired, may be implemented in a parallel fashion where each channel is assigned its unique CMTS MAC software block. It is to be noted that the block diagram of FIG. 7 has been simplified for clarification purposes, and to avoid undue confusion.

Included within the CMTS hardware block 704 is a downstream transmitter 714 and an upstream channel receiver 706. Upstream channel receiver 706 includes a collision detect circuit 708A. The collision detect circuit is configured to detect collisions on the upstream channel caused, for example, by two or more cable modems contending for the same contention slot. One technique for detecting collisions on the upstream channel is to measure and compare power level thresholds. Collision detection techniques are known in the art and therefore will not be described in detail in the present application. Included within the collision detect circuit 708A is a collision counter 708B which is incremented each time a collision is detected. At the beginning of the sampling interval, this counter may be reset to zero so that the total number of collisions detected during the sampling interval may be recorded. At the end of the sampling interval, software within the CMTS MAC software layer 702 reads the number of collisions detected during the sampling interval from the collision detect circuit 708A, and stores this value in a software implemented counter or register ΔNc[i] (720). The number of successful transmissions received by the CMTS (herein referred to the number of successes) may be determined by software and stored within the counter or register ΔNs[i] (722). Additionally, although not used in the technique of the present invention, the number of empty contention slots detected during the sampling interval maybe determined by software and stored within the counter or register ΔNe[i] (724).

The values contained within the counters ΔNc[i] and ΔNs[i] are used by the back-off adjustment procedure (500, FIG. 4) to dynamically adjust the modem back-off parameters for channel[i]. The updated back-off parameters are then sent to MAP building block 710, which incorporates the updated back-off parameters into the next channel[i] MAP which will be broadcast to cable modems associated with channel[i]. Where several different channels exist within the network, each channel will have its own unique set of back-off parameters. The technique of the present invention is able to be used to determine and adjust the modem back-off parameters for each channel in the network. Once the updated channel[i] MAP has been completed, it is forwarded to downstream transmitter 714 for broadcast to the cable modems of the network associated with channel[i].

It is to be understood that although specific embodiments of the present invention have been described involving both hardware and software elements, modifications to the specific embodiments described herein may be implemented by those skilled in the art in order to convert the various elements of the present invention into either hardware or software implementation. It is intended that the scope of the present invention include any and all hardware and/or software implementations of dynamic back-off adjusting techniques which utilize a technique substantially similar to that described in the present invention.

Returning to FIG. 9, following initialization of the relevant counters and/or registers, the start of the sampling interval commences at step 904. During the sampling interval, the incremental counters for each respective channel ΔNc[i] and ΔNs[i] are incremented each time a collision or successful transmission is detected on the associated upstream channel[i]. In a specific embodiment, the length of the sampling interval is about 200 milliseconds. The choice of the sampling interval length is a tradeoff between the desire for faster response times (from the estimation algorithm at the CMTS) and the desire to reduce overhead and inherent delay time involved in reading the hardware collision counter across the PCI bus (such as, for example collision counter 708B, FIG. 7). Choosing a shorter sampling interval may result in a quicker response by the algorithm when collisions are produced. On the other hand, a shorter sampling interval may also require more frequent access to the hardware collision counter(s) across the PCI bus. Each time the hardware collision counter is accessed across the PCI bus, a relatively lengthy delay results. In alternate embodiments of the present invention (not shown), where the number of collisions during the sampling interval is determined relatively quickly (i.e. without relatively lengthy delays), a shorter sampling interval may be preferred.

At 908, a determination is made whether the end of the sampling interval has been reached. At the end of the sampling interval, it is assumed that the ΔNc and ΔNs counters for each respective channel contain the number of collisions and successes detected on that channel during the sampling interval. At 910, an initial value is assigned to [i]. In the specific embodiment of FIG. 9, it is assumed that the initial channel to be selected for analysis is the channel having the lowest value for [i]. As, for example, where channels 0–5 exist within the cable modem network, the initial channel selected would be channel[0], meaning that the value of 0 is assigned to [i] at step 910. It is to be noted, however, that other initial values may be assigned to [i] without departing from the scope of the present invention.

At step 912, the back-off adjustment procedure or subroutine 500 (FIG. 4) is invoked for selected channel[i]. At this point, control is transferred to procedure 500 of FIG. 4.

The back-off adjustment procedure 500 of FIG. 4 analyses the ratio of ΔNc and ΔNs ratio values, and, based upon this analysis, dynamically adjusts the respective BS and BE parameters for a selected channel in the network. Given that the particular channel [i] to be analyzed has been selected by procedure 900 (FIG. 9) and passed on to procedure 500, at step 502, the values for ΔNc and ΔNs associated with channel[i] are extracted. These values represent the total number of collisions and successes, respectively, which were detected on channel[i] during the sampling interval. At step 504, it is determined whether the number of collisions ΔNc is greater than the number of successes ΔNs. Another way of looking at this comparison is to determine whether the ratio ΔNc/ΔNs is greater than the value 1. From the discussion above, it is clear that it is desirable to adjust the modem back-off parameters such that the ratio of ΔNc/ΔNs is approximately equal to 0.7. Accordingly, if step 504 evaluates to true, this means that the number of collisions is greater than the number of successes which, in turn indicates that there is a disproportionately large number of modems contending for upstream access to the CMTS. In order to remedy this problem, it is desirable that each cable modem contending for access increase its corresponding back-off value so as to more evenly distribute requests for contention slots on the upstream channel. Thus, in response, at step 506, the back-off start (BS) parameter value is incremented by a constant value.

In step 506, the back-off start value is incremented by a constant which, in the specific embodiment shown in FIG. 4 is equal to one. Test results show that it is preferable to put an upper limit on the maximum value for back-off start which, in the specific embodiment of FIG. 4 is equal to 15. It is to be understood, however, that other maximum values may be used where appropriate. For example, a smaller maximum value for the back-off start parameter may be appropriate in cable modem networks having relatively few cable modems. On the other hand, larger maximum values for these back-off start parameter may be appropriate, for example, in networks where the CMTS services millions of cable modems. The function MIN(BS+1, 15) chooses the smaller value of either the value 15 or the value resulting from the expression BS+1. Thus, if the value of the expression BS+1 is greater than 15, the back-off start value will be set equal to 15. If, however, the value of the expression BS+1 is less than 15, the back-off start value will be set equal to the value of BS+1.

If the expression in step 504 evaluates to false, meaning that the number of collisions does not exceed the number of successes within the sampling interval, a second evaluation is made at step 508, inquiring whether the number of collisions is less than or equal to one quarter of the number of successes. This expression may also be restated by inquiring whether the ratio of ΔNc/ΔNs less than or equal to the value 0.25.

If the expression in step 508 evaluates to true, it can be concluded that the number of collisions ΔNc is relatively small compared to the number of successful transmissions ΔNs. This could be an indication of two different scenarios, for example, in which it is preferable that the CMTS reduce the back-off window parameters. In a first scenario it is possible that the CMTS is overestimating the number of contending cable modems, and thus randomizing them over too large a back-off interval. In this situation, the contending modems may be choosing random numbers from a large range of values, making it rather unlikely that they collide. However, in such a situation it is quite possible that the modems are backing off too many contention slots, resulting in unnecessary access delay. In a second scenario, there may actually be very few active modems on the upstream channel, and the modems are not colliding in their transmissions. For both of the mentioned scenarios, it is preferable that the CMTS reduce the back-off parameters since the ratio of ΔNc/ΔNs is below the theoretically optimum value of approximately 0.7. Thus in step 510, the value of back-off start parameter (BS) is decremented by a constant value. This, in turn, should cause the ratio of ΔNc/ΔNs to increase.

In step 510, the back-off start value is decremented by a constant, which, in the specific embodiment of FIG. 4, is equal to one. The function MAX(0, BS−1) chooses the higher value of either the value zero or the value of the expression BS−1. In this way, a minimum value of BS=0 is established. It is to be understood, however, that other minimum values for the back-off start parameter may be used where appropriate. Thus, if the value of the expression BS−1 is less than zero, the back-off start value will be set equal to zero in step 510. Conversely, if the value of the expression BS−1 is greater than zero, the back-off start value will be set equal to BS−1 in step 510.

In step 512, the back-off end value is set equal to the back-off start value plus a fixed constant. In the specific embodiment of FIG. 4, this fixed constant is equal to one. It is to be understood, however, that other constant values may be used where appropriate. Additionally, test results have shown that it is preferable to have an upper limit of the back-off end value which, in the specific embodiment of FIG. 4, is equal to 15. Thus, if the value of the expression BS+2 is less than 15, the back-off end parameter will be set equal to BS+2 in step 512. However, if the value of the expression BS+2 is greater than 15, the back-off end parameter will be set equal to 15 in step 512. It is to be noted, that other maximum values for the back-off end parameter may be used where appropriate.

An alternate way of establishing an upper limit for the BE parameter is to reduce the allowable upper limit for the BS parameter. Thus, in an alternate embodiment (not shown), step 506 would be replaced by the expression:

$$BS=\mathrm{MIN}(BS+1,13),$$

and step 512 would be replaced by the expression:

$$BE=BS+2.$$

In this particular embodiment, the maximum value for BS is 13, and the maximum value for BE is BS+2, meaning that the maximum value for BE at most 15. One advantage of this alternate embodiment is that it requires fewer processing steps to execute since the MIN( ) function is not required in step 512.

After the BS and BE parameters for channel[i] have been adjusted or updated, the incremental counters ΔNc and ΔNs associated with selected channel[i] are each reset to zero. In this way the counters are ready to accumulate data for the next sampling interval. After the ΔNc and ΔNs counters have been reset to zero, at step 516, a return command causes control of the procedure to be passed to step 914 of FIG. 9.

Returning to FIG. 9, at step 914, an inquiry is made as to whether the back-off parameters for all channels have been updated. If there are remaining channels to be analyzed for back-off parameter adjustment, then at step 916, the value for [i] is incremented to select the next channel, whereupon the back-off adjustment procedure 500 (FIG. 4) is then executed upon the newly selected channel[i]. Alternatively, if the back-off parameters for all desired channels have been updated, then at step 914 control is transferred to step 904, whereupon a new sampling interval is initiated, and the back-off parameters for all desired channels are again updated in the manner described above.

It is to be noted that in the specific embodiment shown in FIG. 4, the back-off start and back-off end parameters are each incremented or decremented by a constant, where the constant is equal to one or two. However, it is to be understood that other values for these constants may be used where appropriate, and may be determined by those having skill in the relevant art.

For example, an alternate embodiment of the procedure shown in FIG. 4 may incorporate several evaluating steps such as those shown in steps 504 and 508, whereby a more accurate analysis of the ratio of ΔNc/ΔNs is determined. For example, a first step could be determining if the ΔNc/ΔNs value is greater than one. If so, the back-off start parameter could be incremented by a constant value greater than one. However, if the ΔNc/ΔNs value is between 0.8 and 1, for example, the back-off start parameter may be incremented by a relatively lower constant value, such as, for example, one. Likewise, where the value of ΔNc/ΔNs is less than 0.25, the back-off start value may be decremented by a constant greater than one. Where the ΔNc/ΔNs value is between 0.25 and 0.6, for example, the back-off start parameter may be decremented by one.

It is also possible to use a single value as a comparison for dynamically adjusting the modem back-off parameters. For example, an alternate embodiment to the procedure shown in FIG. 4 is to use a single evaluating step where the ratio of ΔNc/ΔNs is compared to the value (e−2). Where the ratio ΔNc/ΔNs is greater than (e−2), the back-off start parameter and back-off end parameter are incremented accordingly, and where the ΔNc/ΔNs ratio is less than (e−2), the back-off start and back-off end parameters are decremented accordingly.

However, it is preferable that a stable interval be provided where there is no increment or decrement to the modem back-off parameters broadcast by the CMTS. Although the value (e−2) is used as a reference point to determine whether to increment or decrement the modem back-off parameters, test results have shown that it is preferable to provide a stable interval around this reference point where no changes to the back-off parameters are made in order to avoid oscillation within the network. Thus, as described in the embodiment of FIG. 4 (and graphically illustrated in FIG. 5), a stable interval of [0.25,1] is provided such that, if the ΔNc/ΔNs ratio falls within this range, no adjustment to the back-off parameters are made. Moreover, test results using the specific embodiment of FIG. 4 have shown that the interval [0.25, 1] provides an acceptable range wherein improved throughput performance of contending cable modems in the network is achieved without undue oscillation.

Additionally, it is to be noted that the range values of 0.25 and 1 provide additional advantages in that they may be conveniently and rapidly implemented in a software algorithm. More specifically, as commonly known to those skilled in the art, software implementation of multiplication or division by a power of 2 may be easily implemented by shifting bits to the right or to the left, as needed. Thus, for example, as shown in step 508 of FIG. 4, in order to compare the value of ΔNc to the value of ΔNs/4, a rapid way of implementing such a comparison is to shift the bits representing the value of ΔNs over two positions to the right, thereby achieving division by 4. This value may then be quickly and rapidly compared to the value of ΔNc. In this way, the dynamic back-off adjustment procedure of the present invention may be implemented in a manner which requires as few processing steps as possible, thereby increasing speed and efficiency within the network.

Figure 5:
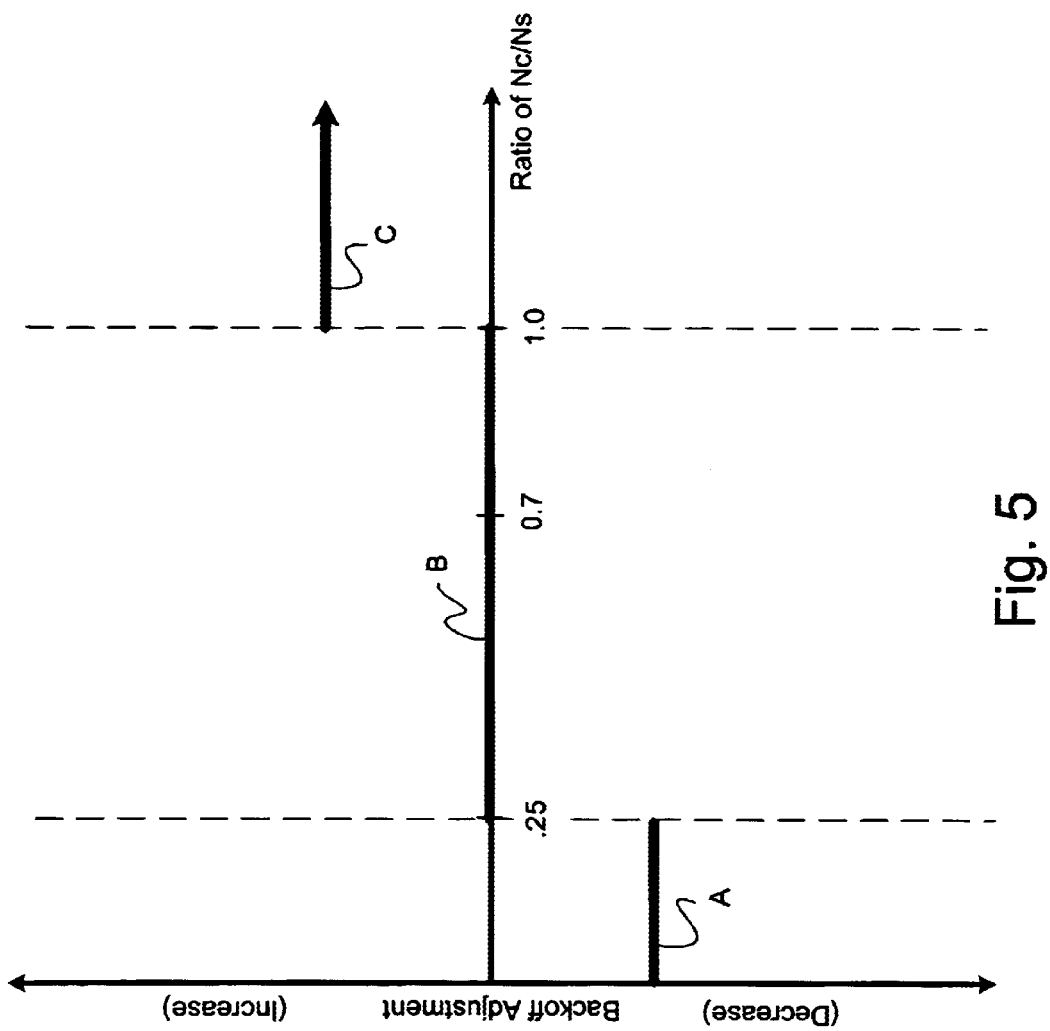
FIG. 5 graphically illustrates one embodiment of the present invention, showing the relationship between the adjustment to the back-off parameters and the ratio of Nc/Ns.

FIG. 5 provides a graphical illustration of the adjustment to the back-off parameters as a function of the ratio of ΔNc/ΔNs, as described in the procedure of FIG. 4. As shown in FIG. 5, the region identified in B provides a stable interval wherein no adjustment to the back off parameters is made. In the specific embodiment of FIG. 4, this stable interval is within the range of [0.25, 1]. If the ratio of ΔNc/ΔNs is less than. 0.25, as shown in region A of FIG. 5, then the values of the back-off parameters, BS and BE, are decreased by respective constant values. If, however, the ratio of ΔNc/ΔNs is greater than one, as shown in region C of FIG. 5, then the value of the back-off parameters BS and BE, are increased by respective constant values.

Figure 6:
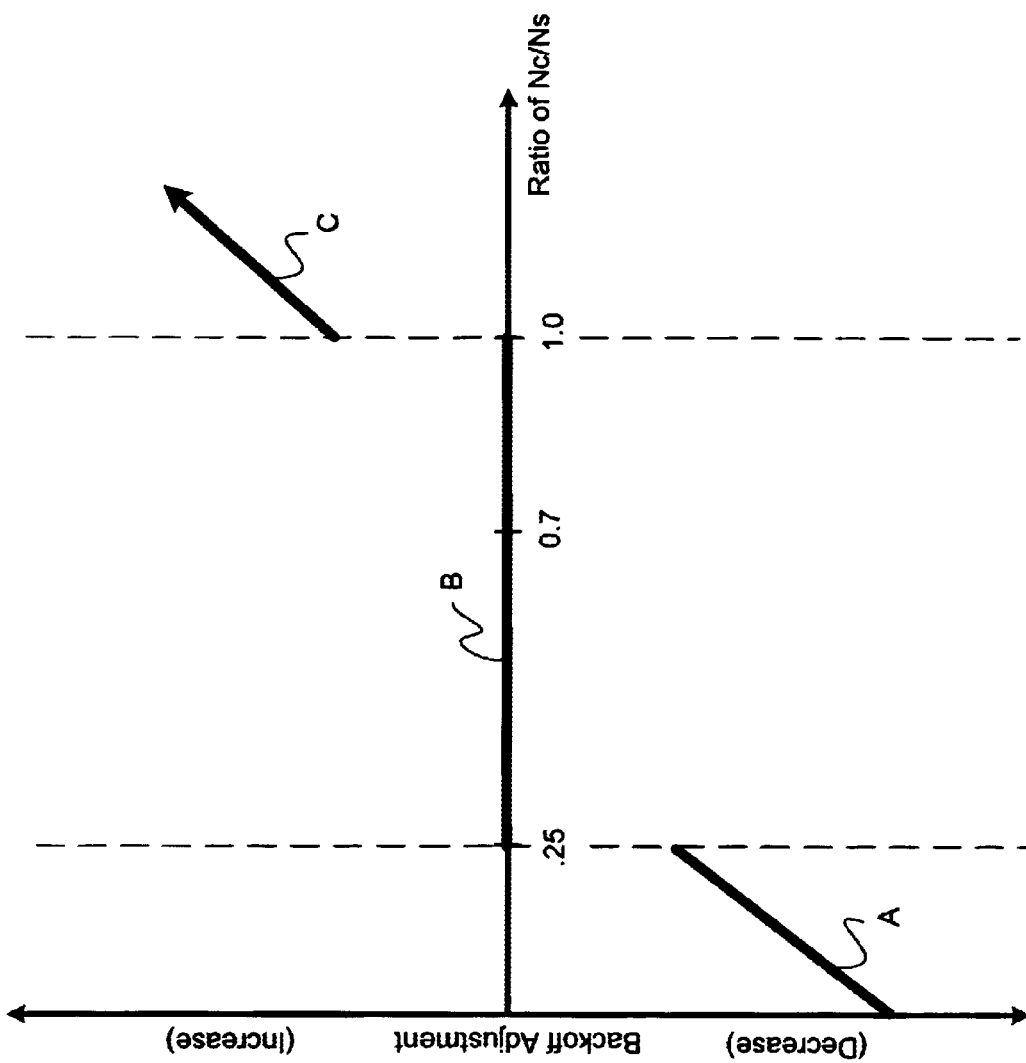
FIG. 6 graphically illustrates an alternate embodiment of the present invention, showing the relationship between the adjustment to the back-off parameters and the ratio of Nc/Ns.

FIG. 6 shows an alternate embodiment of the present invention wherein the adjustment to the back-off parameter values is proportionately related to the ratio of ΔNc/ΔNs value. As described above in reference to FIG. 4 and as shown in FIG. 5, the back-off parameter values are either incremented or decremented by a constant value or values when the ratio of ΔNc/ΔNs falls outside of the range [0.25, 1]. Thus, as shown in FIG. 5, where the ratio of ΔNc/ΔNs is less than 0.25, the value of the of the back-off start parameter is decreased by a constant value as shown in region A of FIG. 5. However, as shown in region A of FIG. 6, as the ratio of ΔNc/ΔNs decreases below the value 0.25, the amount of adjustment made to the back-off start parameter increases (in a negative direction). Similarly, as shown in region C of FIG. 6 as the ratio of ΔNc/ΔNs increases past 1.0, the amount of adjustment to the back-off start parameter is proportionately increased. The techniques shown in FIG. 6 has the advantage of increased sensitivity in the dynamic response and adjustment of the modem back-off parameters.

Figure 8:
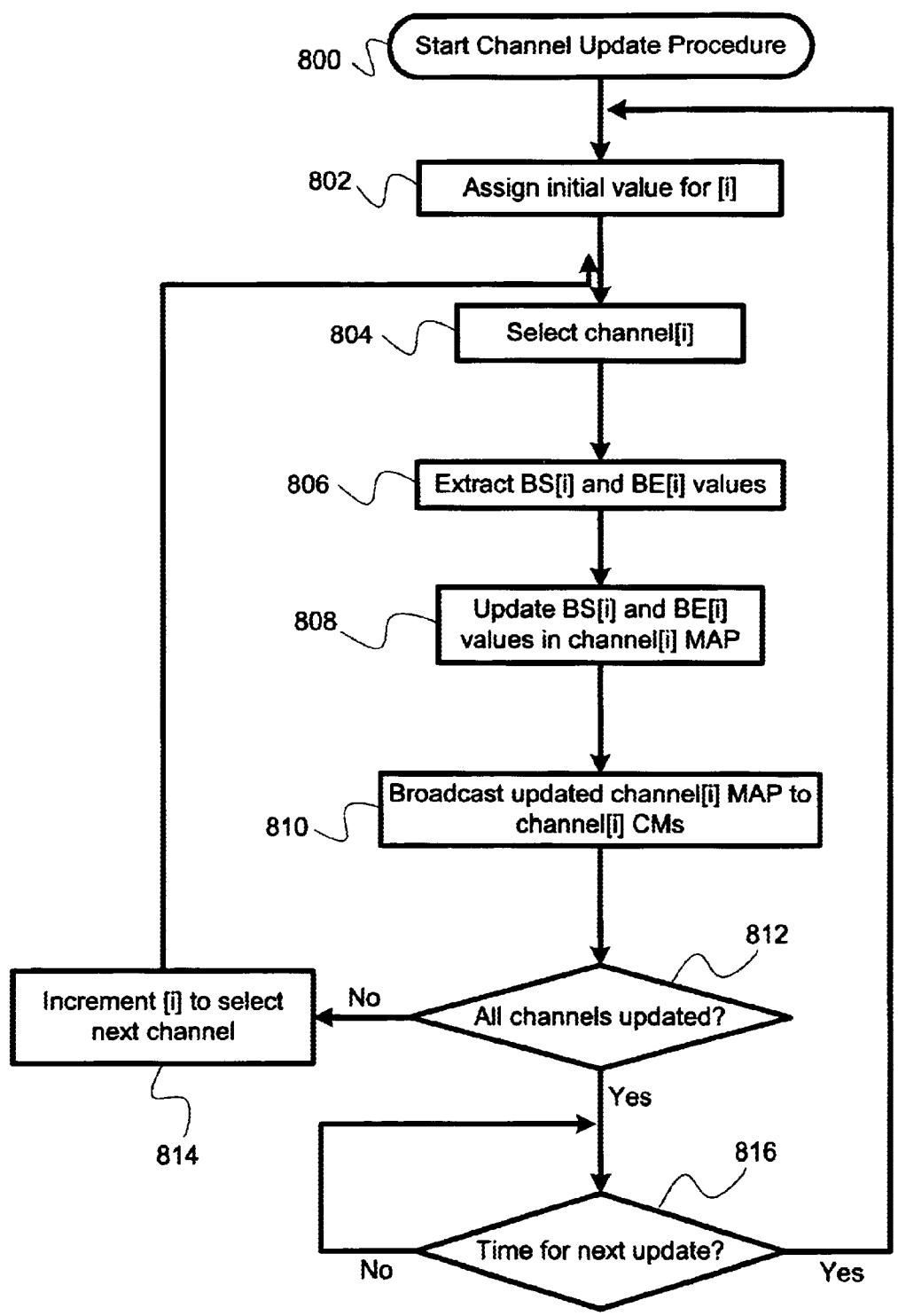
FIG. 8 shows a flow diagram illustrating a technique for broadcasting the updated back-off parameters values to cable modems in the network.

FIG. 8 shows a flow diagram of a specific embodiment of the present invention illustrating a technique for broadcasting the updated BS[i] and BE[i] parameters to at least a portion of the plurality of cable modems in the network associated with channel[i]. The algorithm shown in FIG. 8 may be implemented, for example, within the CMTS block 204 of FIG. 2. At step 802, an initial value is assigned to [i]. This step is similar to step 910 of FIG. 9, and therefore will not be explained in greater detail. At step 804, channel[i] is selected for the next MAP update. At step 806, the values for the BS and BE parameters associated with channel[i] are extracted. At step 808, the BS[i] and BE[i] values are incorporated within the updated MAP for channel[i]. At step 810, the updated MAP for channel[i] is broadcast to the plurality of downstream modems associated with channel[i]. Included within the channel MAP are the BS and BE values, which are received by each cable modem utilizing channel [i]. At step 812, an inquiry is made to determine whether all desired channels have been updated with a respective updated channel MAP. If all desired channels have not been updated, then at step 814, the value [i] is incremented to select the next desired channel for updating, and control is transferred back to step 804, whereupon the back-off parameters for the newly selected channel[i] will be broadcast to cable modems associated with that channel.

After all desired channels have been updated with new MAPs, at step 816, the procedure delays a desired amount before again broadcasting newly updated channel MAPs to each desired channel in the network. The time interval between consecutive channel MAP updates (for each channel) is about every 2 milliseconds. However, the time interval between consecutive back-off parameter updates (for each channel) is about 200 milliseconds. Since the procedure of broadcasting of channel MAP updates may be independent from the procedure of updating the back-off parameters, this means that newly updated back-off parameters for each respective channel are broadcast to the associated cable modems about once every 100 MAP broadcasts. Thus, if the BS and BE values for a selected channel have not yet been updated, the CMTS will incorporate the current BS and BE values in the next channel MAP update. Once the back-off adjustment procedure 500 has updated the BS and BE values for the selected channel, these updated values will automatically be incorporated into the next channel MAP update for the selected channel.

The present invention provides a technique for improving the access-delay/throughput performance of a set of modems sharing a given upstream channel. While the inventive technique has been described with respect to a single upstream channel[i], the technique may be used over entire cable access networks by applying the present technique on each individual upstream channel of that network.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

It is claimed:

1. A method for dynamically adjusting modem back-off parameters in a cable modem network, the cable modem network including a Cable Modem Termination System (CMTS), and including a plurality of cable modems (CM), the modem back-off parameters being utilized by the cable modems to determine a deferment period during which communication requests to the CMTS are not attempted, said back-off parameters including a back-off start (BS) parameter and a back-off end (BE) parameter, the method comprising:

(a) determining a number (Ns) of contention slots in a sampling interval in which modem requests are successfully received by the CMTS;

(b) determining a number (Nc) of contention slots in said sampling interval in which modem requests are unsuccessfully received by the CMTS due to collisions with at least one other modem request;

(c) dynamically adjusting said modem back-off parameters based upon a ratio of said Ns value and said Nc value, wherein the back-off start (BS) parameter is increased if a ratio of Ns/Nc is greater than a first specified value and decreased if the ratio of Ns/Nc is less than a second specified value; and (d) communicating said dynamically adjusted back-off parameters to said plurality of cable modems.

2. The method of claim 1 wherein said successfully received modem requests and said unsuccessfully received modem request are each upstream modem requests sent from said plurality of cable modems to said CMTS.

3. The method of claim 1 further including using the BS and BE parameters in at least one of the plurality of cable modems to select a back-off value or deferring request transmissions to the CMTS.

4. The method of claim 1 wherein said first specified value is not less than 0.72; and wherein said second specified value is not greater than 0.7.

5. The method of claim 1 wherein said first specified value is equal to 1; and wherein said second specified value is equal to 0.025.

6. The method of claim 1 further including adjusting the back-off end (BE) parameter to be a function of the adjusted BS parameter.

7. The method of claim 1 further including:

increasing the back-off end (BE) parameter if the ratio of Ns/Nc is greater than said first specified value; and decreasing the back-off end (BE) parameter if the ratio of Ns/Nc is less than said second specified value.

8. The method of claim 6, wherein the back-off end parameter is adjusted to equal the back-off start parameter plus a predetermined constant.

9. A method for dynamically adjusting modem back-off parameters in a cable modem network, the cable modem network including a Cable Modem Termination System (CMTS), and including a plurality of cable modems (CM), the modem back-off parameters being utilized by the cable modems to determine a deferment period during which communication requests to the CMTS are not attempted, said back-off parameters including a back-off start (BS) parameter and a back-off end (BE) parameter, the method comprising:

(a) comparing estimates of a first number (Ns) of modem requests successfully received by the CMTS with a second number (Nc) of modem requests unsuccessfully received by the CMTS due to collisions between at least two modems contending for a first contention slot;

(b) dynamically adjusting said modem back-off parameters based upon said comparison of said Ns value and said Nc value, wherein the dynamic adjustment of the back-off parameters is not based upon a value representing a number of empty or unused contention slots, and wherein the back-off start (BS) parameter is increased if a ratio of Ns/Nc is greater than a first specified value and decreased if the ratio of Ns/Nc is less than a second specified value; and (c) communicating said dynamically adjusted back-off parameters to said plurality of cable modems.

10. The method of claim 9 wherein said successfully received modem requests and said unsuccessfully received modem request are each upstream modem requests sent from said plurality of cable modems to said CMTS.

11. The method of claim 9 further including using the BS and BE parameters in at least one of the plurality of cable modems to select a back-off value for deferring request transmissions to the CMTS.

12. The method of claim 9 further including adjusting the back-off end (BE) parameter to be a function of the adjusted BS parameter.

13. The method of claim 9 further comprising:

increasing the back-off end (BE) parameter if the ratio of Ns/Nc is greater than said first specified value; and decreasing the back-off end (BE) parameter if the ratio of Ns/Nc is less than said second specified value.

14. An apparatus for dynamically adjusting modem back-off parameters in a cable modem network, the cable modem network including a Cable Modem Termination System (CMTS), and including a plurality of cable modems (CM), the modem back-off parameters being utilized by the cable modems to determine a deferment period during which communication requests to the CMTS are not attempted, said back-off parameters including a back-off start (BS) parameter and a back-off end (BE) parameter, the apparatus comprising:

a counter for determining a number (Ns) of contention slots in a sampling interval in which modem requests are successfully received by the CMTS;

a counter for determining a number (Nc) of contention slots in said sampling interval in which modem requests are unsuccessfully received by the CMTS due to collisions with at least one other modem request;

means for dynamically adjusting said modem back-off parameters based upon a ratio of said Ns value and said Nc value wherein the back-off start (BS) parameter is increased if a ratio of Ns/Nc is greater than a first specified value and decreased if the ratio of Ns/Nc is less than a second specified value; and means for communicating said dynamically adjusted back-off parameters to said plurality of cable modems.

15. The apparatus of claim 14 further including means for using the BS and BE parameters in at least one of the plurality of cable modems to select a back-off value for deferring request transmissions to the CMTS.

16. The apparatus of claim 14 further including means for adjusting the back-off end (BE) parameter to be a function of the adjusted BS parameter.

17. The apparatus of claim 14 further comprising:
means for increasing the back-off end (BE) parameter if the ratio of Ns/Nc is greater than said first specified value; and
means for decreasing the back-off end (BE) parameter if the ratio of Ns/Nc is less than said second specified value.

18. A Cable Modem Termination System (CMTS) in a cable modem network, the cable modem network including a plurality of cable modems (CM), the system comprising:
means for comparing estimates, within a specified time interval, of a first number (Ns) of upstream modem requests successfully received by the CMTS and a second number (Nc) of upstream modem requests unsuccessfully received by the CMTS due to collisions between at least two modems contending for a first contention slot;
means for dynamically adjusting modem back-off parameters based upon said comparison of said Ns value and said Nc value, wherein the dynamic adjustment of the back-off parameters is not a based upon a number of unused contention slots within said specified time interval, and wherein the back-off start (BS) parameter is increased if a ratio of Ns/Nc is greater than a first specified value and decreased if the ratio of Ns/Nc is less than a second specified value; and
means for communicating said dynamically adjusted back-off parameters to said plurality of cable modems, said modem back-off parameters being utilized by the cable modems to determine a deferment period during which communication requests to the CMTS are not attempted, said back-off parameters including a back-off start (BS) parameter and a back-off end (BE) parameter.

19. The system of claim 18 wherein at least one cable modem in said network includes means for using the BS and BE parameters to select a back-off value for deferring request transmissions to the CMTS, said back-off value being a random number not less than the BS parameter and not greater than the BE parameter.

20. The system of claim 18 further including means for adjusting the back-off end (BE) parameter to be a function of the adjusted BS parameter.

21. The system of claim 18 further comprising:
means for increasing the back-off end (BE) parameter if the ratio of Ns/Nc is greater than said first specified value; and
means for decreasing the back-off end (BE) parameter if the ratio of Ns/Nc is less than said second specified value.

22. A computer program product for dynamically adjusting back-off parameters for cable modems in a cable modem network, the cable modem network including a Cable Modem Termination System (CMTS), the modem back-off parameters being utilized by the cable modems to determine a deferment period during which communication requests to the CMTS are not attempted, said back-off parameters including a back-off start (BS) parameter and a back-off end (BE) parameter, the computer program product comprising:
a computer usable medium having computer readable code embodied therein, the computer readable code comprising:
computer code for determining estimates, within a specified time interval, of a first number (Ns) of modem requests successfully received by the CMTS and a second number (Nc) of modem requests unsuccessfully received by the CMTS due to collisions between at least two modems contending for a first contention slot;
computer code for dynamically adjusting said modem back-off parameters based upon a ratio of said Ns and Nc values, wherein the back-off start (BS) parameter is increased if a ratio of Ns/Nc is greater than a first specified value and decreased if the ratio of Ns/Nc is less than a second specified value; and
computer code for communicating said dynamically adjusted back-off parameters to said plurality of cable modems.

23. The computer program product of claim 22, wherein at least one cable modem includes computer code for using the BS and BE parameters to select a back-off value for deferring request transmissions to the CMTS, said back-off value being a random number not less than the BS parameter and not greater than the BE parameter.

24. The computer program product of claim 23 further including computer code for adjusting the back-off end (BE) parameter to be a function of the adjusted BS parameter.

25. The computer program product of claim 22 further comprising:
computer code for increasing the back-off end (BE) parameter if a ratio of Ns/Nc is greater than said first specified value; and
computer code for decreasing the back-off end (BE) parameter if the ratio of Ns/Nc is less than said second specified value.

26. A Cable Modem Termination System (CMTS) in a cable modem network, the cable modem network including a plurality of cable modems (CM), the system comprising:
means for determining estimates, within a specified time interval, of a first number (Ns) of upstream modem requests successfully received by the CMTS and a second number (Nc) of upstream modem requests unsuccessfully received by the CMTS due to collisions between at least two modems contending for a first contention slot;
means for dynamically adjusting modem back-off parameters based upon a ratio of said Ns and Nc values, wherein the back-off start (BS) parameter is increased if a ratio of Ns/Nc is greater than a first specified value and decreased if the ratio of Ns/Nc is less than a second specified value; and
means for communicating said dynamically adjusted back-off parameters to said plurality of cable modems, said modem back-off parameters being utilized by the cable modems to determine a deferment period during which communication requests to the CMTS are not attempted, said back-off parameters including a back-off start (BS) parameter and a back-off end (BE) parameter.

27. The system of claim 26 wherein at least one cable modem in said network includes means for using the BS and BE parameters to select a back-off value for deferring request transmissions to the CMTS, said back-off value being a random number not less than the BS parameter and not greater than the BE parameter.

28. The system of claim 26 further including means for adjusting the back-off end (BE) parameter to be a function of the adjusted BS parameter.

29. The system of claim 26 further comprising:

means for increasing the back-off end (BE) parameter if the ratio of Ns/Nc is greater than said first specified value; and means for decreasing the back-off end (BE) parameter if the ratio of Ns/Nc is less than said second specified value.

30. A computer program product for dynamically adjusting back-off parameters for cable modems in a cable modem network, the cable modem network including a Cable Modem Termination System (CMTS), the modem back-off parameters being utilized by the cable modems to determine a deferment period during which communication requests to the CMTS are not attempted, said back-off parameters including a back-off start (BS) parameter and a back-off end (BE) parameter, the computer program product comprising:

a computer usable medium having computer readable code embodied therein, the computer readable code comprising:

computer code for comparing estimates, within a specified time interval, of a first number (Ns) of modem requests successfully received by the CMTS and a second number (Nc) of modem requests unsuccessfully received by the CMTS due to collisions between at least two modems contending for a first contention slot;

computer code for dynamically adjusting said modem back-off parameters based upon said comparison of said Ns and Nc values, wherein the dynamic adjustment of the back-off parameters is not a based upon a number of unused contention slots within said specified time interval wherein the back-off start (BS) parameter is increased if a ratio of Ns/Nc is greater than a first specified value and decreased if the ratio of Ns/Nc is less than a second specified value; and computer code for communicating said dynamically adjusted back-off parameters to said plurality of cable modems.

31. The computer program product of claim 30, wherein at least one cable modem includes computer code for using the BS and BE parameters to select a back-off value for deferring request transmissions to the CMTS, said back-off value being a random number not less than the BS parameter and not greater than the BE parameter.

32. The computer program product of claim 31 further including computer code for adjusting the back-off end (BE) parameter to be a function of the adjusted BS parameter.

33. The computer program product of claim 30 further comprising:

computer code for increasing the back-off end (BE) parameter if a ratio of Ns/Nc is greater than said first specified value; and computer code for decreasing the back-off end (BE) parameter if the ratio of Ns/Nc is less than said second specified value.

* * * * *